(12) United States Patent
Hai et al.

(10) Patent No.: US 12,212,664 B2
(45) Date of Patent: Jan. 28, 2025

(54) CLOUD PLATFORM RESOURCE CROSS-PROJECT TRANSFER METHOD AND SYSTEM, AND COMPUTER STORAGE MEDIUM

(71) Applicant: INSPUR SUZHOU INTELLIGENT TECHNOLOGY CO., LTD., Jiangsu (CN)

(72) Inventors: Xin Hai, Jiangsu (CN); Yandong Xuan, Jiangsu (CN); Aoyu Ma, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/261,029

(22) PCT Filed: Dec. 30, 2021

(86) PCT No.: PCT/CN2021/142860
§ 371 (c)(1),
(2) Date: Jul. 11, 2023

(87) PCT Pub. No.: WO2023/029322
PCT Pub. Date: Mar. 9, 2023

(65) Prior Publication Data
US 2023/0403141 A1    Dec. 14, 2023

(30) Foreign Application Priority Data
Sep. 6, 2021   (CN) .......................... 202111036126.0

(51) Int. Cl.
*H04L 29/06*     (2006.01)
*G06Q 10/0631*   (2023.01)
(Continued)

(52) U.S. Cl.
CPC ..... *H04L 9/0825* (2013.01); *G06Q 10/06313* (2013.01); *H04L 9/3236* (2013.01)

(58) Field of Classification Search
CPC .... H04L 9/50; H04L 9/3236; H04L 2209/463
See application file for complete search history.

(56) References Cited

U.S. PATENT DOCUMENTS

| | | | |
|---|---|---|---|
| 7,991,632 B1* | 8/2011 | Morris | G06Q 10/0631 705/7.14 |
| 2014/0196051 A1* | 7/2014 | Subramanya | G06Q 10/0631 718/104 |

(Continued)

FOREIGN PATENT DOCUMENTS

| CN | 101604421 A | 12/2009 |
|---|---|---|
| CN | 103562942 A | 2/2014 |

(Continued)

OTHER PUBLICATIONS

International Search Report and Written Opinion for PCT/CN2021/142860 (dated May 17, 2022).

(Continued)

*Primary Examiner* — Taghi T Arani
*Assistant Examiner* — Lin Chang
(74) *Attorney, Agent, or Firm* — Merchant & Gould P.C.

(57) ABSTRACT

The present disclosure discloses a cloud platform resource cross-project transfer method and system, and a computer storage medium. The method includes: generating a slot position and an authentication key for a resource to be transferred based on a transfer request; generating a transfer Identity (ID) of the resource to be transferred, acquiring a project ID where the resource to be transferred is located based on a resource ID, constructing a transfer structure body, and writing the transfer structure body into a database; generating a transfer record of the transfer structure body in the database, and setting a resource status of the resource to (Continued)

be transferred as waiting for transfer in the transfer record; and returning the transfer ID, the authentication key, a transfer description, and the resource ID to a transfer user based on the transfer request.

20 Claims, 6 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 2015/0212857 A1* | 7/2015 | Beveridge | G06F 9/542 |
| | | | 718/1 |
| 2017/0033926 A1* | 2/2017 | Fu | H04L 63/061 |
| 2017/0134520 A1* | 5/2017 | Abbasi | H04L 47/70 |
| 2017/0366538 A1* | 12/2017 | Bowen | H04L 63/0823 |
| 2018/0145989 A1* | 5/2018 | Das | G06F 16/134 |
| 2020/0067697 A1 | 2/2020 | Puddu et al. | |

FOREIGN PATENT DOCUMENTS

| | | | |
|---|---|---|---|
| CN | 103959302 A | | 7/2014 |
| CN | 110880070 | * | 3/2020 |
| CN | 111656386 A | | 9/2020 |
| CN | 111756743 A | | 10/2020 |
| CN | 112468301 A | | 3/2021 |
| CN | 112688934 A | | 4/2021 |
| CN | 113487245 A | | 10/2021 |
| JP | 2014186707 | * | 10/2014 |
| KR | 20140036512 A | | 3/2014 |

OTHER PUBLICATIONS

Search Report for Chinese Patent Application No. 2021110361260 (dated Oct. 12, 2021).

* cited by examiner

CLOUD PLATFORM RESOURCE CROSS-PROJECT TRANSFER METHOD AND SYSTEM, AND COMPUTER STORAGE MEDIUM

CROSS-REFERENCE TO RELATED APPLICATION

The present application is a National Stage Application of PCT International Application No. PCT/CN2021/142860 filed on Dec. 30, 2021, which claims priority to Chinese Patent Application No. 202111036126.0 filed to the China National Intellectual Property Administration on Sep. 6, 2021 and entitled "Cloud platform resource cross-project transfer method and system, and computer storage medium", the disclosure of which is hereby incorporated by reference in its entirety.

TECHNICAL FIELD

The present disclosure relates to the technical field of cloud platforms, and in particular, to a cloud platform resource cross-project transfer method and system, and a computer storage medium.

BACKGROUND

A cloud computing platform is also referred to as a cloud platform, which refers computing, network, and storage capabilities based on services of hardware and software resources. In a cloud platform environment at present, once a cloud platform resource is created, its membership relation cannot be changed. That is, the entire life cycle of the cloud platform resource will be completed under one project. Although this can handle most user scenarios, for certain special user scenarios, a task needs to be completed by the cooperation of a plurality of users. In a typical production line operation scenario, resource transfer characteristics are required to meet this demand.

For example, one project of the cloud platform will be allocated to a company department, and users under the project will be allocated to corresponding employees under this department. When a project is completed through the cooperation of departments, information of project A (a cloud host, or a cloud hard disk, or a file storage instance stored in cloud platform project A) needs to be transferred to project B. In a conventional manner, the user needs to copy data to perform offline transfer. In order to improve the work efficiency, the cloud platform urgently needs to provide a transfer mechanism that allows the user to transfer online resources to other project users in the platform across projects.

SUMMARY

At least some of the embodiments of the present disclosure provides a cloud platform resource cross-project transfer method, which includes the following steps.

A transfer request is received, and a slot position and an authentication key for a resource to be transferred are generated based on the transfer request. The transfer request contains a transfer description and a resource Identity (ID) of the resource to be transferred.

A hash operation is performed on the slot position and the authentication key to obtain an encrypted hash authentication character string.

A transfer ID of the resource to be transferred is generated, a project ID where the resource to be transferred is located is acquired based on the resource ID, a transfer structure body is constructed based on the transfer ID, the project ID where the resource to be transferred is located, the slot position, the authentication key, and the encrypted hash authentication character string, and the transfer structure body is written into a database.

A transfer record of the transfer structure body is generated in the database, and a resource status of the resource to be transferred is set as waiting for transfer in the transfer record.

The transfer ID, the authentication key, the transfer description, and the resource ID are returned to a transfer user based on the transfer request.

In some implementations, the method further includes the following operations.

A transfer accepting request of the resource to be transferred is received. The transfer accepting request contains the transfer ID and the authentication key.

A corresponding slot position and a corresponding encrypted hash authentication character string are acquired in the database based on the transfer ID.

A hash operation is performed on the corresponding slot position and the authentication key in the transfer accepting request to obtain a transfer accepting encrypted hash authentication character string, the transfer accepting encrypted hash authentication character string is compared with the corresponding encrypted hash authentication character string, and whether authentication is successful is determined based on a comparison result.

In response to that the authentication is successful based on the comparison result, when a project where a transfer accepting user is located has a project quota to accommodate the resource to be transferred, the resource to be transferred is transferred to the project quota of the project where the transfer accepting user is located in response to that the project where the transfer accepting user is located has the project quota to accommodate the resource to be transferred.

In some implementations, the method further includes the following operation.

When the project where the transfer accepting user is located does not have the project quota to accommodate the resource to be transferred, error information is returned to the transfer accepting user in response to that the project where the transfer accepting user is located does not have the project quota to accommodate the resource to be transferred.

In some implementations, the operation that the resource to be transferred is transferred to the project quota of the project where the transfer accepting user is located in response to that the project where the transfer accepting user is located has the project quota to accommodate the resource to be transferred further includes the following operations.

The project ID and a user ID where the resource to be transferred is located are updated into the project ID and the user ID where the transfer accepting user is located through the database, and the resource status of the resource to be transferred is set as available.

In some implementations, the method further includes the following operations.

In response to the resource status being waiting for transfer and receiving a transfer canceling request, wherein the transfer canceling request contains the transfer ID of the resource to be transferred;

a transfer record corresponding to the transfer ID is searched from the database.

In response to finding the transfer record corresponding to the transfer ID from the database, the transfer record is deleted, and the resource status is set as available.

In some implementations, the method further includes the following operation.

In response to not finding the transfer record corresponding to the transfer ID from the database, error report information is returned to the transfer user.

In some implementations, the operation that the transfer ID of the resource to be transferred is generated includes the following operations.

A random Universally Unique Identifier (UUID) character string is generated based on a UUID4 algorithm, and the character string is taken as the transfer ID of the resource to be transferred.

In some implementations, the transfer request is a transfer rest request, the transfer rest request is configured to put information to be transferred into a request body of the transfer rest request, after obtaining return information, put the return information into a return body of the transfer rest request to return the return information to the transfer user. The information to be transferred includes the transfer description and the resource ID, and the return information includes the transfer ID, the authentication key, the transfer description, and the resource ID.

An embodiment of the present disclosure provides a cloud platform resource cross-project transfer system. The system includes a request receiving module, a hash operation module, a construction module, a record generating module, and a request returning module.

The request receiving module is configured to receive a transfer request, and generate a slot position and an authentication key for a resource to be transferred based on the transfer request. The transfer request contains a transfer description and a resource ID of the resource to be transferred.

The hash operation module is configured to perform a hash operation on the slot position and the authentication key to obtain an encrypted hash authentication character string.

The construction module is configured to generate a transfer ID of the resource to be transferred, acquire a project ID where the resource to be transferred is located based on the resource ID, construct a transfer structure body based on the transfer ID, the project ID where the resource to be transferred is located, the slot position, the authentication key, and the encrypted hash authentication character string, and write the transfer structure body into a database.

The record generating module is configured to generate a transfer record of the transfer structure body in the database, and set a resource status of the resource to be transferred as waiting for transfer in the transfer record.

The request returning module is configured to return the transfer ID, the authentication key, the transfer description, and the resource ID to a transfer user based on the transfer request.

In some implementations, the system further includes a transfer accepting receiving module, an acquisition module, a comparison module, and a transfer module.

The transfer accepting receiving module is configured to receive a transfer accepting request for the resource to be transferred. The transfer accepting request contains the transfer ID and the authentication key.

The acquisition module is configured to acquire a corresponding slot position and a corresponding encrypted hash authentication character string in the database based on the transfer ID.

The comparison module is configured to perform a hash operation on the corresponding slot position and the authentication key in the transfer accepting request to obtain a transfer accepting encrypted hash authentication character string, compare the transfer accepting encrypted hash authentication character string with the corresponding encrypted hash authentication character string, and determine whether authentication is successful based on a comparison result.

The transfer module is configured to: in response to that the authentication is successful based on the comparison result, when a project where a transfer accepting user is located has a project quota to accommodate the resource to be transferred, the resource to be transferred is transferred to the project quota of the project where the transfer accepting user is located in response to that the project where the transfer accepting user is located has the project quota to accommodate the resource to be transferred.

In some implementations, the transfer module is further configured to:

when the project where the transfer accepting user is located does not have the project quota to accommodate the resource to be transferred, error information is returned to the transfer accepting user in response to that the project where the transfer accepting user is located does not have the project quota to accommodate the resource to be transferred.

In some implementations, the operation that the resource to be transferred is transferred to the project quota of the project where the transfer accepting user is located in response to that the project where the transfer accepting user is located has the project quota to accommodate the resource to be transferred further includes the following operations.

The project ID and a user ID where the resource to be transferred is located are updated into the project ID and the user ID where the transfer accepting user is located through the database, and the resource status of the resource to be transferred is set as available.

In some implementations, the system further includes the following operations.

In response to the resource status being waiting for transfer and receiving a transfer canceling request, wherein the transfer canceling request contains the transfer ID of the resource to be transferred;

a transfer record corresponding to the transfer ID is searched from the database.

In response to finding the transfer record corresponding to the transfer ID from the database, the transfer record is deleted, and the resource status is set as available.

In some implementations, the system further includes the following operation.

In response to not finding the transfer record corresponding to the transfer ID from the database, error report information is returned to the transfer user.

In some implementations, the operation that the transfer ID of the resource to be transferred is generated includes the following operations.

A random UUID character string is generated based on a UUID4 algorithm, and the character string is taken as the transfer ID of the resource to be transferred.

In some implementations, the transfer request is a transfer rest request, the transfer rest request is configured to put information to be transferred into a request body of the transfer rest request, after obtaining return information, put the return information into a return body of the transfer rest request to return the return information to the transfer user. The information to be transferred includes the transfer description and the resource ID, and the return information includes the transfer ID, the authentication key, the transfer description, and the resource ID.

The embodiment of the present disclosure further provides at least one non-volatile computer-readable storage medium, the non-volatile computer-readable storage medium is configured to store a computer-readable instruction. When the computer-readable instruction is executed by at least one processor, the at least one processor performs steps of any of the above cloud platform resource cross-project transfer methods.

The embodiment of the present disclosure further provides a computer device, including a memory and at least one processor. The memory is configured to store a computer-readable instruction. When the computer-readable instruction is executed by the at least one processor, the at least one processor performs steps of any of the above cloud platform resource cross-project transfer methods.

Details of at least one embodiment of the present disclosure is set forth in the following drawings and description. Other features and advantages of the present disclosure will become apparent from the specification, the drawings, and the claims.

BRIEF DESCRIPTION OF THE DRAWINGS

In order to illustrate the embodiments of the present disclosure or methods in the conventional art more clearly, the drawings that need to be used in the description of the embodiments or the conventional art will be briefly described below. It is apparent that the drawings in the following description are only some embodiments of the present disclosure, and other drawings can be obtained by those skilled in the art according to these drawings without any creative work.

DETAILED DESCRIPTION OF THE EMBODIMENTS

In order to make the purposes, methods, and advantages of the present disclosure clearer, the embodiments of the present disclosure will be further described in detail below with reference to embodiments and the drawings.

It is to be noted that, all expressions using "first" and "second" in the embodiments of the present disclosure are for the purpose of distinguishing two non-identical entities with the same name or non-identical parameters. It may be seen that "first" and "second" are only for the convenience of expression, and should not be construed as a limitation to the embodiments of the present disclosure, which are not described one by one thereto in the subsequent embodiments.

Some proper nouns mentioned in the present disclosure are explained below.

A cloud platform resource: a cloud host, a cloud hard disk, a file storage instance, a network instance, and the like created by a user in a cloud platform all belong to platform resources. Any platform resource belongs to designated projects and users within the cloud platform. In addition, the resources under different projects are isolated from one another, and the resources cannot be accessed across projects.

Resource cross-project transfer: the resource cross-project transfer refers to that a resource owner in the cloud platform (a certain user under a certain project) sets his/her own specific resource as a to-be-transferred status, and authentication information is generated. The authentication information is notified to the designated users that are to accept transfer under the designated project to complete a resource transfer authentication process. Finally, the membership relation of the specific resource will be changed, and a source project and a user are changed into the project and the user that accept the transfer of the specific resource. A behavior of accepting resource transfer is referred to as: transfer acceptance.

Project quota: there are different projects on the cloud platform, and each project has a plurality of users. Each project has its own project quota. That is, the maximum number of resources that the project can have, and the maximum capacity of resources that can be allocated. New resources created by a project user or transfer accepting resources cannot exceed a quota corresponding to the project, and an operation will fail when the new resources created by the project user or the transfer accepting resources exceed the quota corresponding to the project.

Figure 1:
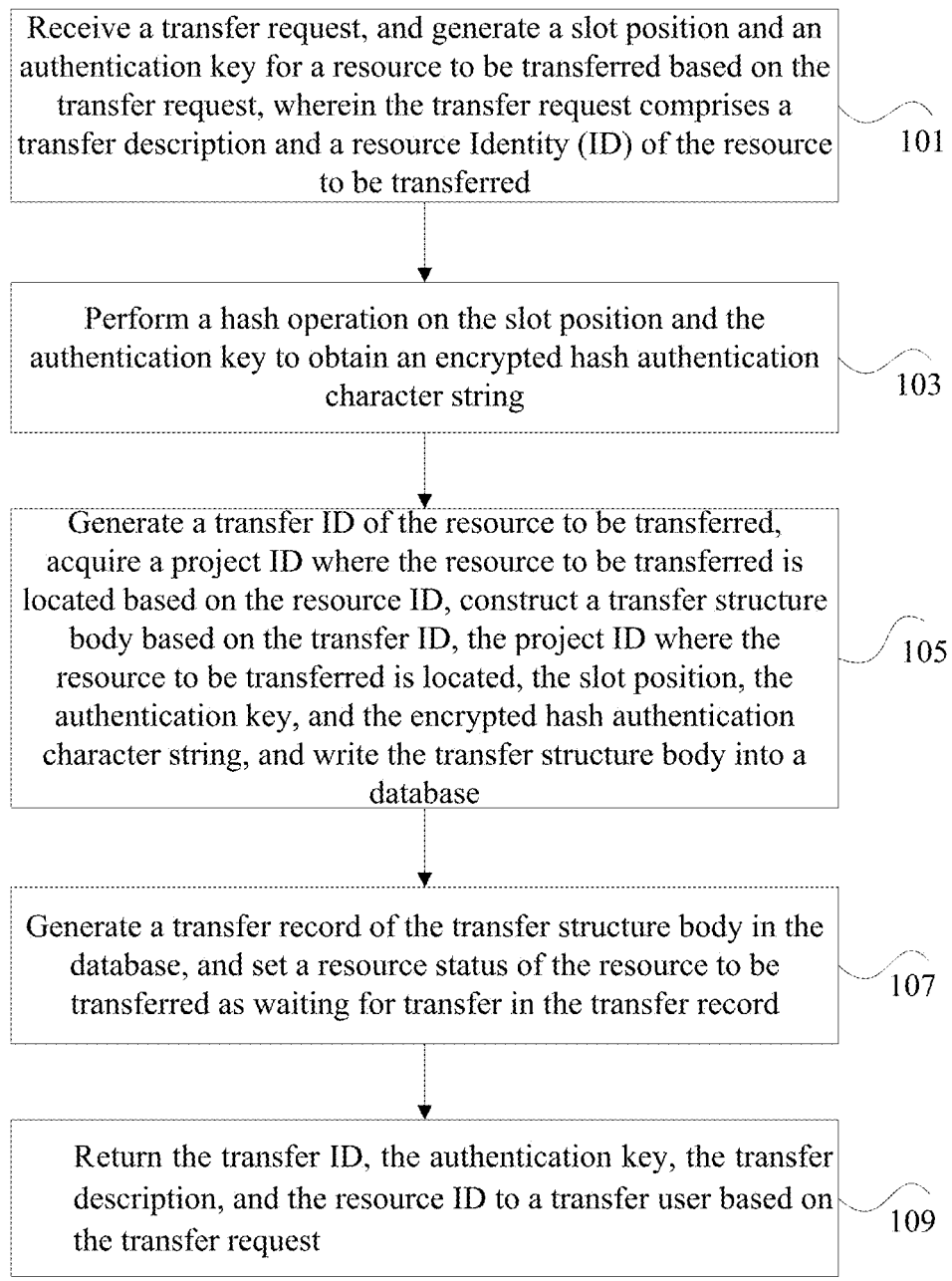
FIG. 1 is a block diagram of an embodiment of a cloud platform resource cross-project transfer method provided according to an embodiment of this disclosure.

Based on the above objective, in an embodiment, the embodiment of the present disclosure provides a cloud platform resource cross-project transfer method. As shown in FIG. 1, the method includes the following steps.

At step 101, a transfer request is received, and a slot position and an authentication key for a resource to be transferred are generated based on the transfer request, wherein the transfer request contains a transfer description and a resource ID of the resource to be transferred.

At step 103, a hash operation is performed on the slot position and the authentication key to obtain an encrypted hash authentication character string.

At step 105, a transfer ID of the resource to be transferred is generated, a project ID where the resource to be transferred is located is acquired based on the resource ID, a transfer structure body is constructed based on the transfer ID, the project ID where the resource to be transferred is located, the slot position, the authentication key, and the encrypted hash authentication character string, and the transfer structure body is written into a database.

At step 107, a transfer record of the transfer structure body is generated in the database, and a resource status of the resource to be transferred is set as waiting for transfer in the transfer record.

At step 109, the transfer ID, the authentication key, the transfer description, and the resource ID are returned to a transfer user based on the transfer request.

Figure 2:
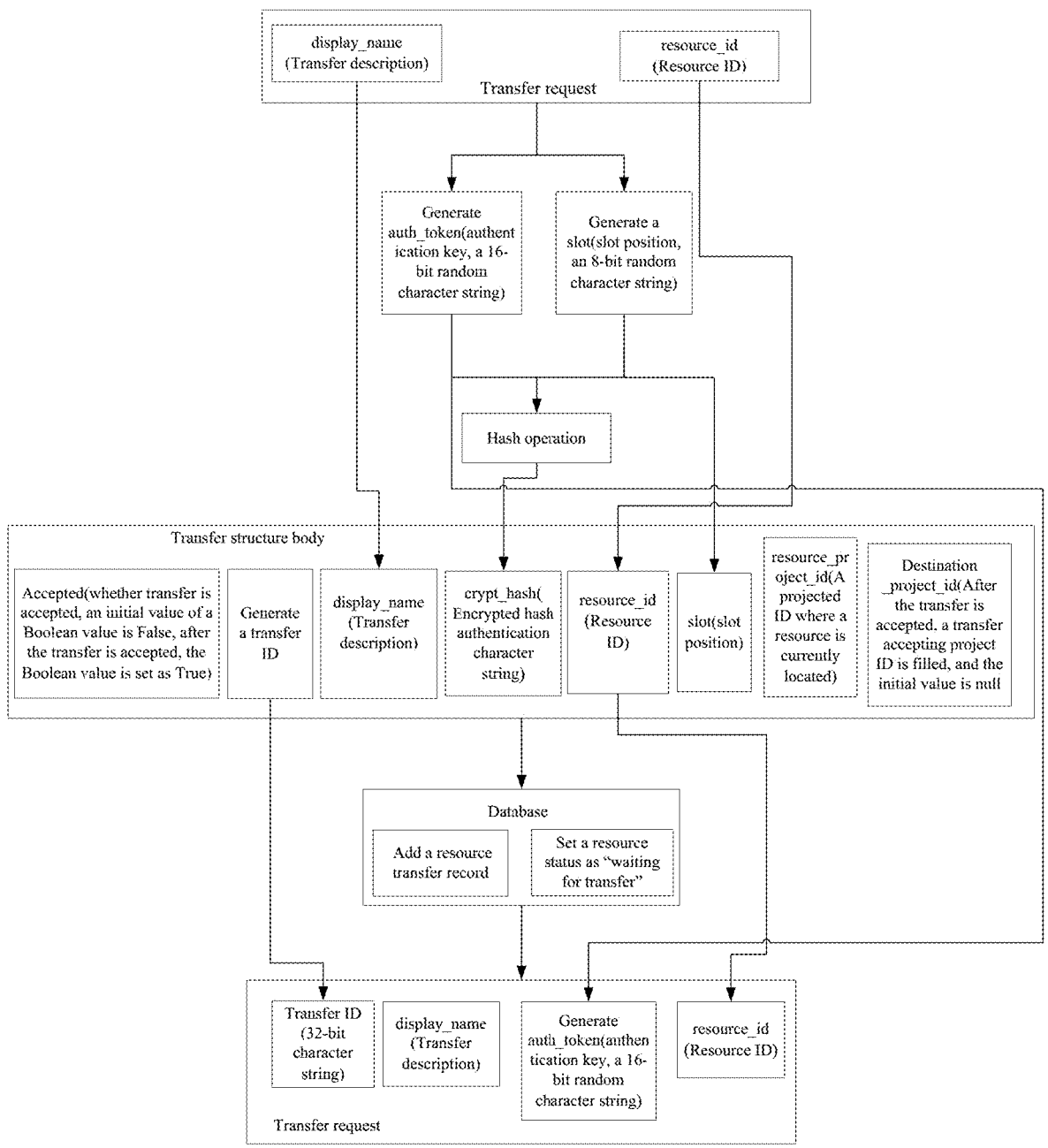
FIG. 2 is a schematic flowchart of an embodiment of generating transfer information provided according to an embodiment of this disclosure.

As shown in FIG. 2, it is a schematic flowchart that a user transmits a transfer request to a server to generate transfer information.

The user (a transfer user) transmits the transfer request to the server. The transfer request contains a resource ID resource_id and a transfer description display_name of a resource to be transferred. After the server receives the transfer request, two character strings are generated randomly, one is a slot position (slot) with a default length of 8 bits, and the other is an authentication key auth_token with a default length of 16 bits; the slot and the auth_token are subjected to Hash operation encryption to obtain an encrypted hash authentication character string crypt_hash after being encrypted; a transfer ID with a length of 32 bits is generated as a unique ID of the present transfer, a project ID where a resource to be transferred is currently located is acquired source_project_id, and a transfer structure body is constructed; the transfer structure body includes: accepted (whether the transfer is accepted, an initial value of a Boolean value is False, after the transfer is accepted, the Boolean value is set as True), the transfer ID, the display_name (the transfer description), the crypt_hash (the encrypted hash authentication character string), the slot, the resource_id (the resource ID), the source_project_id (the project ID where the resource to be transferred is currently located), and destination_project_id (after the transfer is completed, the destination_project_id will be perfected, and the initial value of the destination_project_id is null); the above transfer structure body is written into the database, that is, a transfer record is added to the database, and the resource status of the resource to be transferred is set as "waiting for transfer". The information to be returned, that is, the transfer ID, the auth_token, the resoruce_id, and the display_name, are put into the transfer request one by one, and the transfer request is returned to the transfer user.

The transfer user informs the transfer ID and the auth_token to the transfer accepting user. The transfer accepting user transmits the transfer accepting request, that is, a transfer accepting request, to the server based on the transfer ID and the auth_token to accept the resource transfer.

Through the above embodiments, resource transfer information is generated based on the interaction between the server and the database in a cloud platform and is returned to the transfer user, so that the transfer user may transmit the resource transfer information to the transfer accepting user. Therefore, the transfer accepting user may accept the resource transfer based on the server. Through the above embodiments, the cross-project resource transfer in the cloud platform environment is realized, the operation is simple and convenient, and the security is high.

In some implementations, the method further includes the following operations.

A transfer accepting request of the resource to be transferred is received. The transfer accepting request contains the transfer ID and the authentication key.

A corresponding slot position and a corresponding encrypted hash authentication character string are acquired in the database based on the transfer ID.

A hash operation is performed on the corresponding slot position and the authentication key in the transfer accepting request to obtain a transfer accepting encrypted hash authentication character string, the transfer accepting encrypted hash authentication character string is compared with the corresponding encrypted hash authentication character string, and whether authentication is successful is determined based on a comparison result.

In response to that the authentication is successful based on the comparison result, determines whether a project where a transfer accepting user is located has a project quota to accommodate the resource to be transferred.

The resource to be transferred is transferred to the project quota of the project where the transfer accepting user is located in response to that the project where the transfer accepting user is located has the project quota to accommodate the resource to be transferred.

In an embodiment, the server in the cloud platform determines whether the project where the transfer accepting user is located has a project quota to accommodate the resource to be transferred, and determines that the project where the transfer accepting user is located has the project quota to accommodate the resource to be transferred, and transfers the resource to be transferred to the project quota of the project where the transfer accepting user is located based on a determination result.

In some implementations, the method further includes the following operation.

In response to that the project where the transfer accepting user is located does not have the project quota to accommodate the resource to be transferred, error information is returned to the transfer accepting user.

In an embodiment, the server in the cloud platform determines whether the project where the transfer accepting user is located has a project quota to accommodate the resource to be transferred, and determines that the project where the transfer accepting user is located does not have the project quota to accommodate the resource to be transferred, and returns error information to the transfer accepting user based on the determination result.

In some implementations, the operation that the resource to be transferred is transferred to the project quota of the project where the transfer accepting user is located in response to that the project where the transfer accepting user is located has the project quota to accommodate the resource to be transferred further includes the following operations.

The project ID and a user ID where the resource to be transferred is located are updated into the project ID and the user ID where the transfer accepting user is located through the database, and the resource status of the resource to be transferred is set as available.

A plurality of implementations of the present disclosure are described below through specific embodiments.

Figure 3:
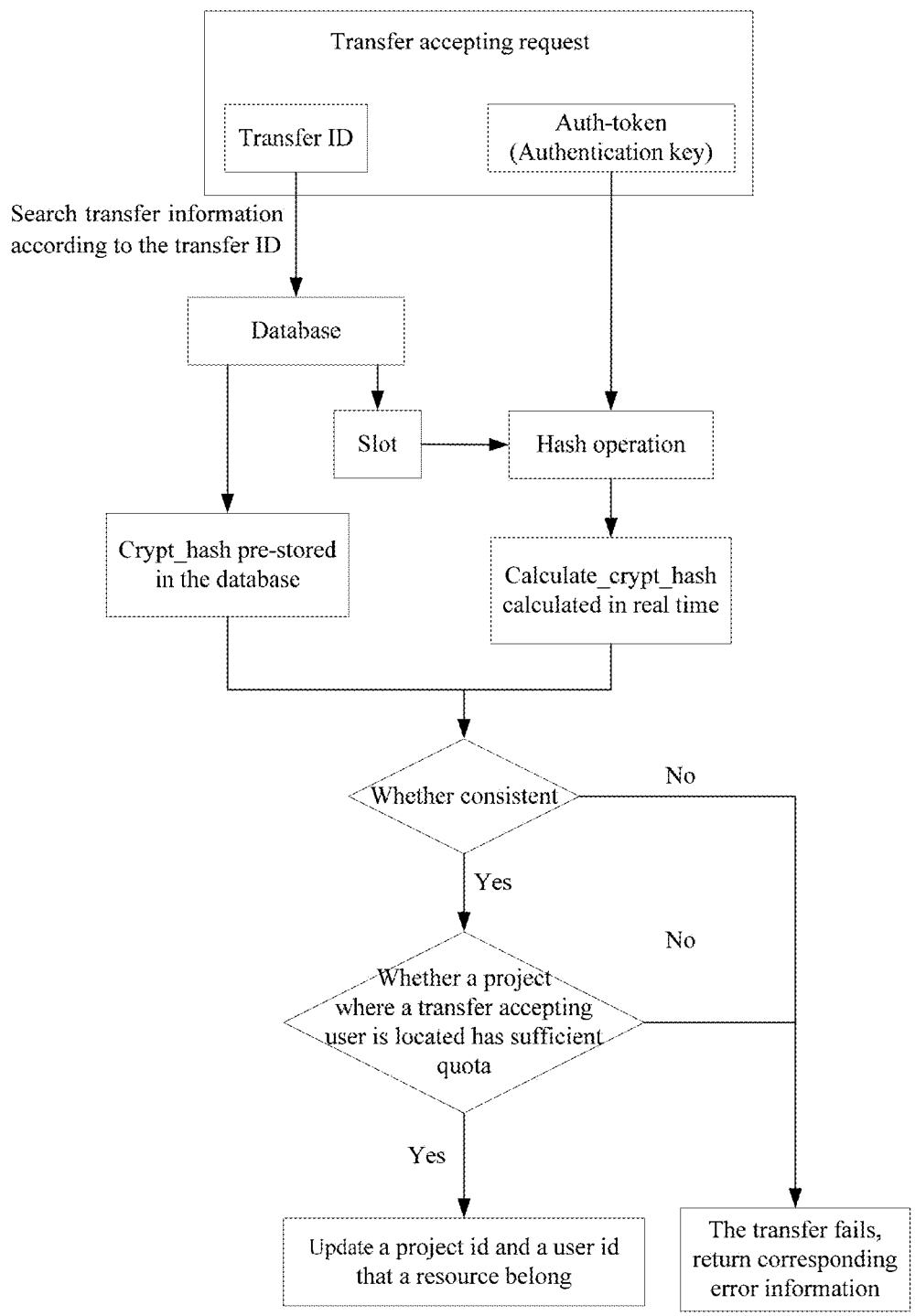
FIG. 3 is a schematic flowchart of an embodiment of receiving a resource to be transferred by a transfer accepting user provided according to an embodiment of this disclosure.

As shown in FIG. 3, it is a schematic flowchart of receiving the resource to be transferred by the transfer accepting user.

The server receives a transfer accepting rest request of the transfer accepting user to the resource to be transferred. The transfer accepting rest request contains a transfer ID and an authentication key auth_token. The server searches the database for a slot position (slot) corresponding to the transfer ID and the crypt_hash pre-stored in the database according to the transfer ID, performs a Hash operation by using the slot and the auth_token provided by the transfer accepting rest request to obtain a transfer accepting encrypted hash authentication character string calculated in real time calculate_crypt_hash, and compares whether the calculate_crypt_hash is consistent with the crypt_hash. When the calculate_crypt_hash is not consistent with the crypt_hash, the authentication fails, the transfer cannot be accepted, and authentication failure information is returned. When the calculate_crypt_hash is consistent with the crypt_hash, whether the project where a user accepting the resource is located has sufficient project quota to accept the transfer is checked, the transfer is completed when the project where the user accepting the resource is located has sufficient project quota to accept the transfer. The project ID and the user ID where the resource to be transferred is located are updated into the project ID and the transfer accepting user ID where the transfer accepting user is located through the database, and the resource status of the resource to be transferred is reset as "available". Error information indicating that the project quota of the project where the user accepting the resource is located is insufficient is returned when the project where the user accepting the resource is located does not have sufficient project quota to accept the transfer.

Through the above embodiments, the transfer accepting user transmits the transfer accepting request to the server. The server authenticates the transfer accepting request to accept the resource transfer. Through the above embodiments, the cross-project resource transfer in the cloud platform environment is realized, the operation is simple and convenient, and the security is high.

In some implementations, the method further includes the following operations.

In response to the resource status being waiting for transfer and receiving a transfer canceling request, wherein the transfer canceling request contains the transfer ID of the resource to be transferred;
    a transfer record corresponding to the transfer ID is searched from the database.

In response to finding the transfer record corresponding to the transfer ID from the database, the transfer record is deleted, and the resource status is set as available.

In some implementations, the method further includes the following operation.

In response to not finding the transfer record corresponding to the transfer ID from the database, error report information is returned to the transfer user.

A plurality of implementations of the present disclosure are described below through specific embodiments.

Figure 4:
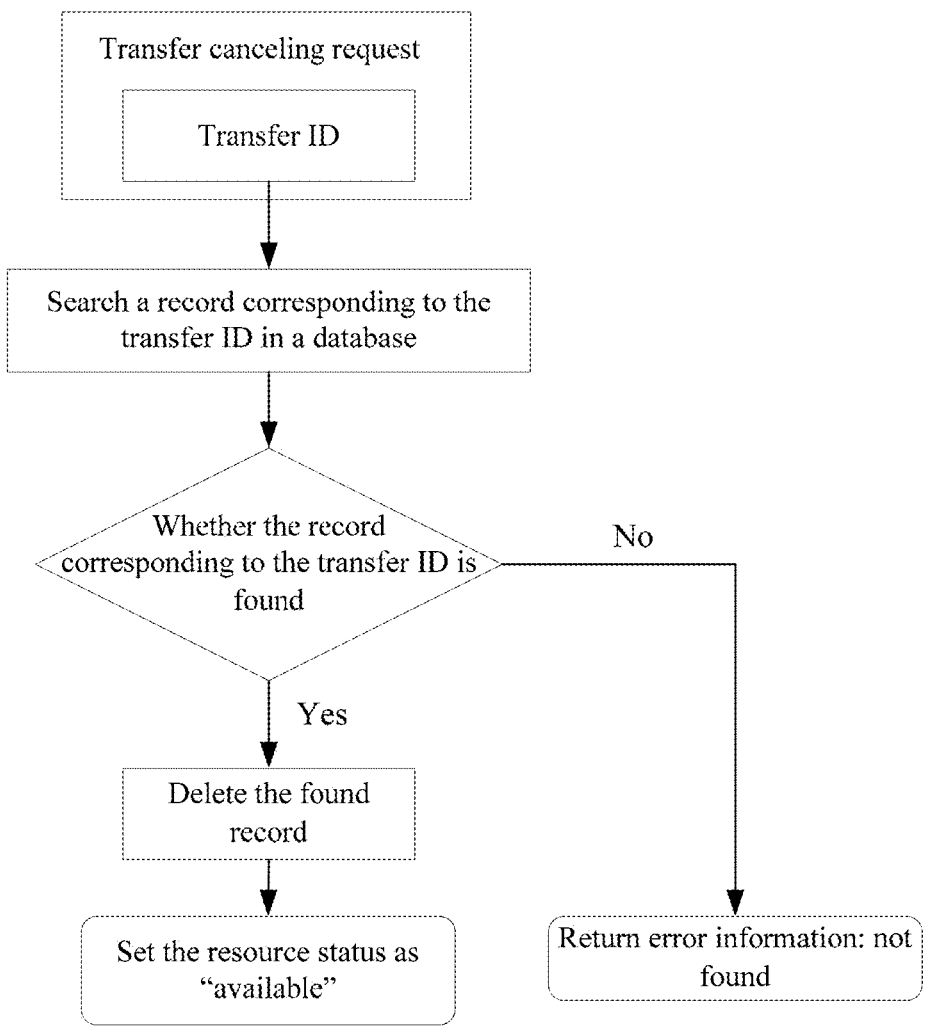
FIG. 4 is a schematic flowchart of an embodiment of canceling transfer provided according to an embodiment of this disclosure.

After initiating the transfer, when the transfer user finds the leakage of the authentication key, or does not want to transfer, or wants to cancel the transfer of the resources due to other reasons, the transfer user may initiate a transfer canceling request when the resource is still in a status of "waiting for transferring" before the resource transfer is accepted. As shown in FIG. 4, it is a schematic flowchart of canceling the transfer. The transfer canceling request contains the transfer ID. The transfer user initiates the transfer canceling request to the server. The server searches a transfer record corresponding to the transfer ID in the database. When the transfer record corresponding to the transfer ID is found, the transfer record is deleted from the database, and the resource status is set as "available". When the transfer record corresponding to the transfer ID is not found, error report information indicating that the transfer record is not found is returned to the transfer user.

After the transfer is canceled, the authentication key corresponding to the canceled transfer will fail accordingly. When the transfer needs to continue, the user may initiate the transfer again, and generate a new transfer ID and new transfer key to ensure the reliability of transfer information.

In some implementations, the operation that the transfer ID of the resource to be transferred is generated includes the following operations.

A random UUID character string is generated based on a UUID4 algorithm, and the character string is taken as the transfer ID of the resource to be transferred.

In some implementations, the transfer request is a transfer rest request, the transfer rest request is configured to put information to be transferred into a request body of the transfer rest request, after obtaining return information, put the return information into a return body of the transfer rest request to return the return information to the transfer user. The information to be transferred includes the transfer description and the resource ID, and the return information includes the transfer ID, the authentication key, the transfer description, and the resource ID.

Through the embodiment of the present disclosure, the cross-project resource transfer in the cloud platform environment is realized, the operation is simple and convenient, and the security is high. The embodiment of the present disclosure improves the interactive capability between cloud platform projects, meets the requirements for an interaction between users, and improves the easiness and the convenient of the cloud platform.

Figure 5:
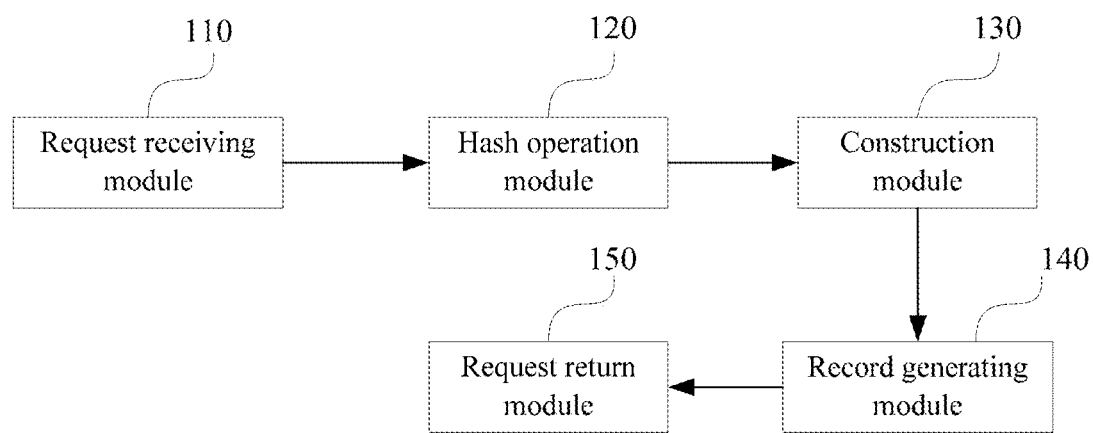
FIG. 5 is a schematic diagram of an embodiment of a cloud platform resource cross-project transfer method provided according to an embodiment of this disclosure.

Based on the same concept of the present disclosure, according to another aspect of the present disclosure, as shown in FIG. 5, an embodiment of the present disclosure further provides a cloud platform resource cross-project transfer system. The system includes a request receiving module 110, a hash operation module 120, a construction module 130, a record generating module 140, and a request returning module 150.

The request receiving module 110 is configured to receive a transfer request, and generate a slot position and an authentication key for a resource to be transferred based on the transfer request. The transfer request contains a transfer description and a resource ID of the resource to be transferred.

The hash operation module 120 is configured to perform a hash operation on the slot position and the authentication key to obtain an encrypted hash authentication character string.

The construction module 130 is configured to generate a transfer ID of the resource to be transferred, acquire a project ID where the resource to be transferred is located based on the resource ID, construct a transfer structure body based on the transfer ID, the project ID where the resource to be transferred is located, the slot position, the authentication key, and the encrypted hash authentication character string, and write the transfer structure body into a database.

The record generating module 140 is configured to generate a transfer record of the transfer structure body in the database, and set a resource status of the resource to be transferred as waiting for transfer in the transfer record.

The request returning module 150 is configured to return the transfer ID, the authentication key, the transfer description, and the resource ID to the transfer user based on the transfer request.

In some implementations, the system further includes: a transfer accepting receiving module, an acquisition module, a comparison module, a determination module, and a transfer module.

The transfer accepting receiving module is configured to receive a transfer accepting request for the resource to be transferred. The transfer accepting request contains the transfer ID and the authentication key.

The acquisition module is configured to acquire a corresponding slot position and a corresponding encrypted hash authentication character string in the database based on the transfer ID.

The comparison module is configured to perform a hash operation on the corresponding slot position and the authentication key in the transfer accepting request to obtain a transfer accepting encrypted hash authentication character string, compare the transfer accepting encrypted hash authentication character string with the corresponding encrypted hash authentication character string, and determine whether authentication is successful based on a comparison result.

The determination module is configured to determine whether a project where a transfer accepting user is located has a project quota to accommodate the resource to be transferred in response to that the authentication is successful based on the comparison result.

The transfer module is configured to transfer the resource to be transferred to the project quota of the project where the transfer accepting user is located in response to that the project where the transfer accepting user is located has the project quota to accommodate the resource to be transferred.

In some implementations, the transfer module is further configured to:

Return error information to the transfer accepting user in response to that the project where the transfer accepting user is located does not have the project quota to accommodate the resource to be transferred.

In some implementations, the operation that the resource to be transferred is transferred to the project quota of the project where the transfer accepting user is located in response to that the project where the transfer accepting user is located has the project quota to accommodate the resource to be transferred further includes the following operations.

The project ID and a user ID where the resource to be transferred is located are updated into the project ID and the user ID where the transfer accepting user is located through the database, and the resource status of the resource to be transferred is set as available.

In some implementations, the system further includes the following operations.

In response to the resource status being waiting for transfer and receiving a transfer canceling request, wherein the transfer canceling request contains the transfer ID of the resource to be transferred;

a transfer record corresponding to the transfer ID is searched from the database.

In response to finding the transfer record corresponding to the transfer ID from the database, the transfer record is deleted, and the resource status is set as available.

In some implementations, the system further includes the following operation.

In response to not finding the transfer record corresponding to the transfer ID from the database, error report information is returned to the transfer user.

In some implementations, the operation that the transfer ID of the resource to be transferred is generated includes the following operations.

A random UUID character string is generated based on a UUID4 algorithm, and the character string is taken as the transfer ID of the resource to be transferred.

In some implementations, the transfer request is a transfer rest request, the transfer rest request is configured to put information to be transferred into a request body of the transfer rest request, after obtaining return information, put the return information into a return body of the transfer rest request to return the return information to the transfer user. The information to be transferred includes the transfer description and the resource ID, and the return information includes the transfer ID, the authentication key, the transfer description, and the resource ID.

Figure 6:
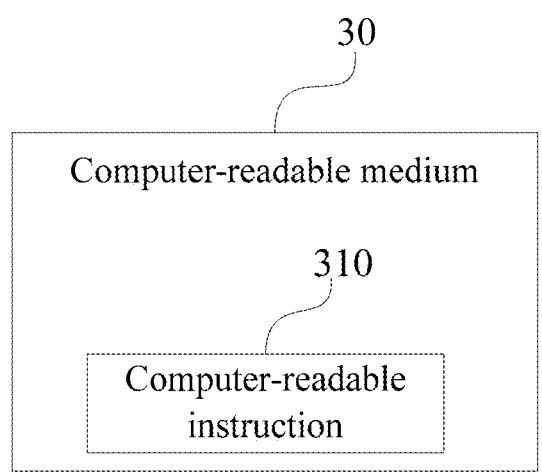
FIG. 6 is a schematic structural diagram of an embodiment of a computer-readable storage medium provided according to an embodiment of this disclosure.

Based on the same concept of the present disclosure, according to another aspect of the present disclosure, as shown in FIG. 6, a non-volatile readable storage medium 30 provided by an embodiment of the present disclosure. The non-volatile readable storage medium 30 is configured to store a computer-readable instruction 310. The steps of a cloud platform resource cross-project transfer method of any of the above embodiment will be implemented when the computer-readable instruction 310 is executed by at least one processor.

Figure 7:
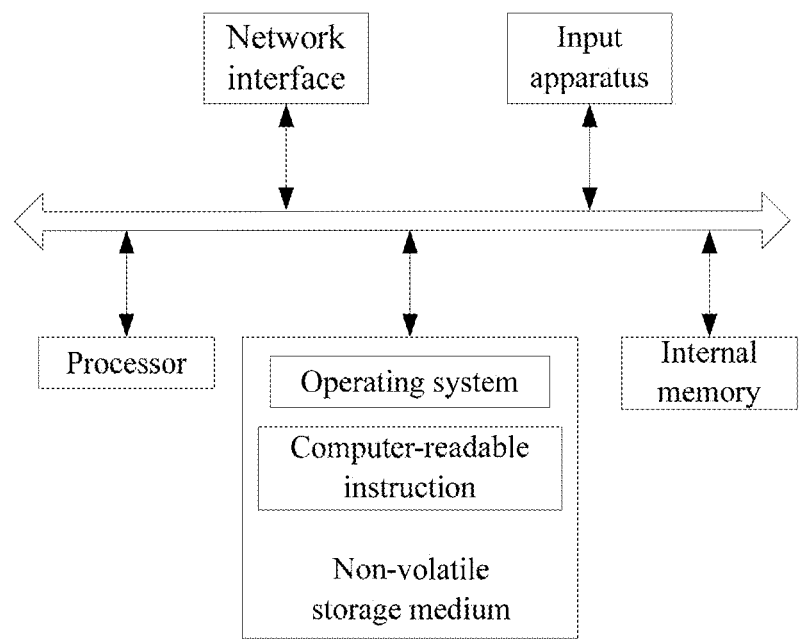
FIG. 7 is a schematic structural diagram of a computer device provided according to an embodiment of this disclosure.

In some embodiments, a computer device is provided. The computer device may be a terminal or a server, and an internal structure of the computer device as shown in FIG. 7. The computer device includes a processor, a memory, a network interface and an input apparatus connected by a system bus. The processor is configured to provide computing and control capabilities. The memory includes a non-volatile storage medium and an internal memory. The non-volatile storage medium is configured to store an operating system and computer-readable instructions. The internal memory is configured to provide an environment for the operation of the operating system and computer-readable instructions in the non-volatile storage medium. The network interface of the computer device is configured to connect and communicate with an external terminal or server through a network. The steps of a cloud platform resource cross-project transfer method will be implemented when the computer-readable instruction is executed by a processor. The input apparatus may be a touch layer covered on the display screen, or may be a key, a trackball or a touch pad arranged on a housing of the computer device, and may be an external keyboard, a touch pad, a mouse, or the like.

It is to be understood by those skilled in the art that the structures shown in FIG. 7 are block diagrams of part structures relevant to the solution of the present disclosure and do not constitute a limitation on the device to which the solution of the present disclosure, and that a specific device may include more or less components than those shown in the drawings, or some components may be combined, or have a different arrangement of components.

Those skilled in the art will also appreciate that various exemplary logical blocks, modules, circuits, and algorithm steps described in combination with the disclosure herein may be implemented as electronic hardware, computer software, or a combination of the electronic hardware and the computer software. To clearly describe such interchangeability of hardware and software, various illustrative components, blocks, modules, circuits, and steps have been described generally in terms of their functionality. Whether such functionality is implemented as software or hardware depends on the specific application and design constraints imposed on the entire system. Those skilled in the art may implement the functions in various ways for each specific application, but such implementation decisions are not to be interpreted as causing a departure from the scope of the disclosed embodiments of the disclosure.

The above are exemplary embodiments of the present disclosure, but it is to be noted that, multiple changes and modifications may be made without departing from the scope disclosed in the embodiments of the present disclosure as defined in the claims. The functions, steps and/or actions of the method claims in accordance with the disclosed embodiments described herein need not be performed in any particular order. In addition, although elements disclosed in the embodiments of the present disclosure may be described or claimed in the singular, unless explicitly limited to the singular, the plural may also be construed.

It is to be understood that, as used herein, the singular form "a" is intended to include the plural form as well, unless the context clearly supports an exception. It is also be understood that, "and/or" as used herein is meant to include any and all possible combinations of at least one of the associated listed items.

The serial numbers of the foregoing embodiments of the present disclosure are merely for description, and do not represent the superiority or inferiority of the embodiments.

Those of ordinary skill in the art may understand that, all or part of the steps in the above embodiments may be completed by means of hardware, or may be completed by instructing the related hardware through a program. The program may be stored in a computer-readable storage medium, and the foregoing storage medium may be a Read Only Memory (ROM), a magnetic disk, or an optical disk.

Those of ordinary skill in the art should understand that the discussion of any of the embodiments above is merely exemplary, and is not intended to imply that the scope (including the claims) disclosed in the embodiments of the present disclosure is limited to these examples. Under the idea of the embodiments of the present disclosure, the technical features in the embodiments above or different embodiments can also be combined. In addition, there are many other changes in different aspects of the embodiments above of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A cloud platform resource cross-project transfer method, comprising:
    receiving a transfer request, and generating a slot position and an authentication key for a resource to be transferred based on the transfer request, wherein the transfer request comprises a transfer description and a resource Identity (ID) of the resource to be transferred;
    performing a hash operation on the slot position and the authentication key to obtain an encrypted hash authentication character string;
    generating a transfer ID of the resource to be transferred, acquiring a project ID where the resource to be transferred is located based on the resource ID, constructing a transfer structure body based on the transfer ID, the project ID where the resource to be transferred is located, the slot position, the authentication key, and the encrypted hash authentication character string, and writing the transfer structure body into a database;
    generating a transfer record of the transfer structure body in the database, and setting a resource status of the resource to be transferred as waiting for transfer in the transfer record; and
    returning the transfer ID, the authentication key, the transfer description, and the resource ID to a transfer user based on the transfer request.

2. The method as claimed in claim 1, further comprising:
    receiving a transfer accepting request of the resource to be transferred, wherein the transfer accepting request comprises the transfer ID and the authentication key;
    acquiring a corresponding slot position and a corresponding encrypted hash authentication character string in the database based on the transfer ID;
    performing a hash operation on the corresponding slot position and the authentication key in the transfer accepting request to obtain a transfer accepting encrypted hash authentication character string, and comparing the transfer accepting encrypted hash authentication character string with the corresponding encrypted hash authentication character string, and determining whether authentication is successful based on a comparison result; and
    in response to that the authentication is successful based on the comparison result, when a project where a transfer accepting user is located has a project quota to accommodate the resource to be transferred, transferring the resource to be transferred to the project quota of the project where the transfer accepting user is located in response to that the project where the transfer accepting user is located has the project quota to accommodate the resource to be transferred.

3. The method as claimed in claim 2, further comprising:
    when the project where the transfer accepting user is located does not have the project quota to accommodate the resource to be transferred, returning error information to the transfer accepting user in response to that the project where the transfer accepting user is located does not have the project quota to accommodate the resource to be transferred.

4. The method as claimed in claim 3, wherein the transferring the resource to be transferred to the project quota of the project where the transfer accepting user is located in response to that the project where the transfer accepting user is located has the project quota to accommodate the resource to be transferred further comprises:
    updating the project ID and a user ID where the resource to be transferred is located into the project ID and the user ID where the transfer accepting user is located through the database, and setting the resource status of the resource to be transferred as available.

5. The method as claimed in claim 1, further comprising:
    in response to the resource status being waiting for transfer and receiving a transfer canceling request, wherein the transfer canceling request comprises the transfer ID of the resource to be transferred;
    searching a transfer record corresponding to the transfer ID from the database; and
    in response to finding the transfer record corresponding to the transfer ID from the database, deleting the transfer record, and setting the resource status as available.

6. The method as claimed in claim 5, further comprising:
    in response to not finding the transfer record corresponding to the transfer ID from the database, returning error report information to the transfer user.

7. The method as claimed in claim 1, wherein the generating the transfer ID of the resource to be transferred comprises:
    generating a random Universally Unique Identifier (UUID) character string based on a UUID4 algorithm, and taking the character string as the transfer ID of the resource to be transferred.

8. The method as claimed in claim 1, wherein the transfer request is a transfer rest request, the transfer rest request is configured to put information to be transferred into a request body of the transfer rest request, after obtaining return information, put the return information into a return body of the transfer rest request to return the return information to the transfer user, wherein the information to be transferred comprises the transfer description and the resource ID, the return information comprises the transfer ID, the authentication key, the transfer description, and the resource ID.

9. At least one non-volatile computer-readable storage medium,
    the non-volatile computer-readable storage medium is configured to store a computer-readable instruction, wherein when the computer-readable instruction is executed by at least one processor, cause the processor to:

receive a transfer request, and generate a slot position and an authentication key for a resource to be transferred based on the transfer request, wherein the transfer request comprises a transfer description and a resource Identity (ID) of the resource to be transferred;

perform a hash operation on the slot position and the authentication key to obtain an encrypted hash authentication character string;

generate a transfer ID of the resource to be transferred, acquire a project ID where the resource to be transferred is located based on the resource ID, construct a transfer structure body based on the transfer ID, the project ID where the resource to be transferred is located, the slot position, the authentication key, and the encrypted hash authentication character string, and write the transfer structure body into a database;

generate a transfer record of the transfer structure body in the database, and set a resource status of the resource to be transferred as waiting for transfer in the transfer record; and return the transfer ID, the authentication key, the transfer description, and the resource ID to a transfer user based on the transfer request.

10. A computer device, comprising a memory and at least one processor, the memory is configured to store a computer-readable instruction, wherein when the computer-readable instruction is executed by the at least one processor, cause the processor to:

receive a transfer request, and generate a slot position and an authentication key for a resource to be transferred based on the transfer request, wherein the transfer request comprises a transfer description and a resource Identity (ID) of the resource to be transferred;

perform a hash operation on the slot position and the authentication key to obtain an encrypted hash authentication character string;

generate a transfer ID of the resource to be transferred, acquire a project ID where the resource to be transferred is located based on the resource ID, construct a transfer structure body based on the transfer ID, the project ID where the resource to be transferred is located, the slot position, the authentication key, and the encrypted hash authentication character string, and write the transfer structure body into a database;

generate a transfer record of the transfer structure body in the database, and set a resource status of the resource to be transferred as waiting for transfer in the transfer record; and return the transfer ID, the authentication key, the transfer description, and the resource ID to a transfer user based on the transfer request.

11. The method as claimed in claim 2, wherein the determining whether authentication is successful based on a comparison result further comprises:

When the transfer accepting encrypted hash authentication character string is consistent with the corresponding encrypted hash authentication character string, determining the authentication is successful based on the comparison result;

When the transfer accepting encrypted hash authentication character string is not consistent with the corresponding encrypted hash authentication character string, determining the authentication is failed based on the comparison result.

12. The method as claimed in claim 11, further comprising:

in response to the authentication is failed based on the comparison result, returning authentication failure information.

13. The method as claimed in claim 3, wherein the error information indicating that the project quota of the project where the user accepting the resource is located is insufficient.

14. The method as claimed in claim 6, wherein the error report information indicating that the transfer record is not found.

15. The method as claimed in claim 5, wherein further comprising:

After the transfer is canceled, the authentication key corresponding to the canceled transfer will fail accordingly.

16. The non-volatile computer-readable storage medium as claimed in claim 9, wherein when the computer-readable instruction is executed by at least one processor, cause the processor to:

receive a transfer accepting request of the resource to be transferred, wherein the transfer accepting request comprises the transfer ID and the authentication key;

acquire a corresponding slot position and a corresponding encrypted hash authentication character string in the database based on the transfer ID;

perform a hash operation on the corresponding slot position and the authentication key in the transfer accepting request to obtain a transfer accepting encrypted hash authentication character string, and compare the transfer accepting encrypted hash authentication character string with the corresponding encrypted hash authentication character string, and determine whether authentication is successful based on a comparison result; and in response to that the authentication is successful based on the comparison result, when a project where a transfer accepting user is located has a project quota to accommodate the resource to be transferred, transfer the resource to be transferred to the project quota of the project where the transfer accepting user is located in response to that the project where the transfer accepting user is located has the project quota to accommodate the resource to be transferred.

17. The non-volatile computer-readable storage medium as claimed in claim 16, wherein when the computer-readable instruction is executed by at least one processor, cause the processor to:

when the project where the transfer accepting user is located does not have the project quota to accommodate the resource to be transferred, return error information to the transfer accepting user in response to that the project where the transfer accepting user is located does not have the project quota to accommodate the resource to be transferred.

18. The non-volatile computer-readable storage medium as claimed in claim 9, wherein when the computer-readable instruction is executed by at least one processor, cause the processor to:

in response to the resource status being waiting for transfer and receive a transfer canceling request, wherein the transfer canceling request comprises the transfer ID of the resource to be transferred;

search a transfer record corresponding to the transfer ID from the database; and in response to finding the transfer record corresponding to the transfer ID from the database, delete the transfer record, and set the resource status as available.

19. The non-volatile computer-readable storage medium as claimed in claim 9, wherein when the computer-readable instruction is executed by at least one processor, cause the processor to:
in response to not finding the transfer record corresponding to the transfer ID from the database, return error report information to the transfer user.

20. The non-volatile computer-readable storage medium as claimed in claim 9, wherein when the computer-readable instruction is executed by at least one processor, cause the processor to:
generate a random Universally Unique Identifier (UUID) character string based on a UUID4 algorithm, and take the character string as the transfer ID of the resource to be transferred.

\* \* \* \* \*